United States Patent

[19]

Nickel et al.

[11] 4,265,813
[45] May 5, 1981

[54] AZO DYESTUFFS

[75] Inventors: Horst Nickel; Karl H. Schündehütte, both of Leverkusen, Fed. Rep. of Germany

[73] Assignee: Bayer Aktiengesellschaft, Leverkusen, Fed. Rep. of Germany

[21] Appl. No.: 955,493

[22] Filed: Oct. 27, 1978

[30] Foreign Application Priority Data

Oct. 29, 1977 [DE] Fed. Rep. of Germany ....... 2748719

[51] Int. Cl.³ .............................................. C09B 35/36
[52] U.S. Cl. ..................................... 260/170; 8/41 R
[58] Field of Search ........................... 260/170; 8/41 R

[56] References Cited
FOREIGN PATENT DOCUMENTS 7205964 11/1972 Netherlands ............................. 260/170
667225 2/1952 United Kingdom ..................... 260/170

*Primary Examiner*—Paul F. Shaver
*Attorney, Agent, or Firm*—Sprung, Felfe, Horn, Lynch & Kramer

[57] ABSTRACT

Azo dyestuffs which, in the form of the free acid, correspond to the formula

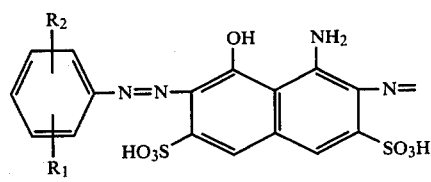

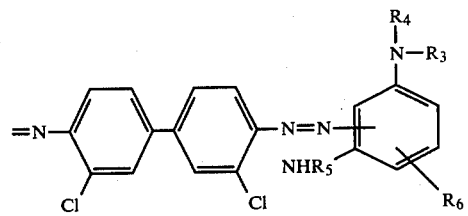

wherein
$R_1$ denotes hydrogen, methyl or chlorine,
$R_2$ denotes hydrogen, chlorine, acetylamino, methoxy, ethoxy, nitro or carboxyl,
$R_3$ denotes hydrogen, sulpho-$C_1$-$C_2$-alkyl, carboxy-$C_1$-$C_2$-alkyl or $C_1$-$C_4$-alkyl,
$R_4$ denotes hydrogen or $C_1$-$C_4$-alkyl,
$R_5$ denotes hydrogen or acyl and
$R_6$ denotes hydrogen, methyl, methoxy, ethoxy, chlorine, carboxyl, nitro or sulpho, and their preparation and use for dyeing substrates which can be dyed with direct dyestuffs.

5 Claims, No Drawings

AZO DYESTUFFS

The invention relates to azo dyestuffs which, in the form of the free acid, correspond to the formula

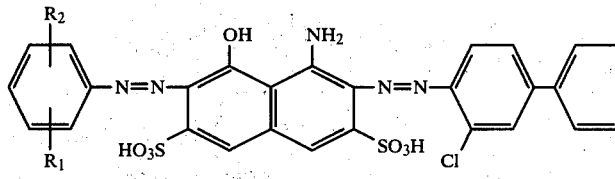 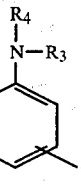

wherein
$R_1$ denotes hydrogen, methyl or chlorine,
$R_2$ denotes hydrogen, chlorine, acetylamino, methoxy, ethoxy, nitro or carboxyl,
$R_3$ denotes hydrogen, sulpho-$C_1$-$C_2$-alkyl, carboxy-$C_1$-$C_2$-alkyl or $C_1$-$C_4$-alkyl,
$R_4$ denotes hydrogen or $C_1$-$C_4$-alkyl,
$R_5$ denotes hydrogen or acyl and
$R_6$ denotes hydrogen, methyl, methoxy, ethoxy, chlorine, carboxyl, nitro or sulpho.

Acyl is, in particular, $C_1$-$C_4$-alkylcarbonyl, oxalyl and benzoyl.

The new dyestuffs are obtained by bis-diazotising 4,4'-diamino-3,3'-dichlorodiphenyl, coupling the bis-diazotisation product to 1-amino-8-hydroxynaphthalene-3,6-disulphonic acid in an acid medium, coupling the diazoaminoazo intermediate compound to a coupling component of the formula

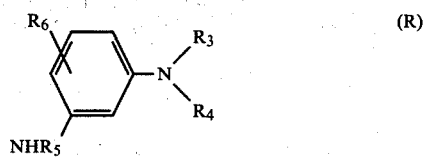

wherein
$R_3$, $R_4$, $R_5$ and $R_6$ have the meanings indicated above, and coupling to the bisazo dyestuff thus obtainable a diazotised amine of the formula

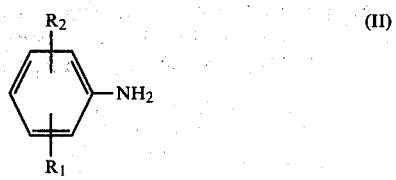

wherein
$R_1$ and $R_2$ have the abovementioned meanings, in an alkaline medium.

Particularly preferred dyestuffs within the formula (I) are those in which R denotes 1,3-diaminophenyl, 1-sulphomethylamino-3-aminophenyl and 1-(N,N-diethylamino)-3-acetylaminophenyl, and above all 1-sulpho-2,4-diaminophenyl.

The new dyestuffs are suitable for dyeing all substrates which can be dyed with direct dyestuffs, for example cotton, paper, polyamide and leather, but in particular cotton, in reddish-tinged to greenish-tinged black or black-green shades of good fastness properties, in particular good fastness to wet processing and light.

The dyestuffs of the formula (I) are generally employed in the form of their alkali metal salts, in particular in the form of their sodium salts or potassium salts; however, lithium salts, ammonium salts or amine salts and solutions of such salts can also be prepared and used.

EXAMPLE 1

25.3 g (0.1 mol) of 3,3'-dichloro-4,4'-diaminodiphenyl suspended in 250 ml of water and 70 g of 28% strength hydrochloric acid with ice at 0° C. are bis-diazotised in the customary manner with 47 g of 30% strength sodium nitrite solution. The bis-diazonium salt solution, which has been filtered over active charcoal, is combined with a solution of 31.9 g (0.1 mol) of 1-amino-8-hydroxynaphthalene-3,6-disulphonic acid (H-acid) in 250 ml of water, at pH 6.5. The acid H-acid coupling reaction is brought to completion by adding about 75 ml of 20% strength sodium carbonate solution dropwise, so that finally the bis-diazonium salt can no longer be detected.

A solution of 10 g of m-phenylenediamine in 150 ml of water is now added, the mixture is stirred for half an hour and about 20 ml of 20% strength sodium carbonate solution are added dropwise until the pH is 5. After a short time, the second coupling reaction has ended. The disazo dyestuff has precipitated and, after being isolated, is dissolved by adding about 75 g of 40% strength sodium hydroxide solution. 150 ml of 20% strength sodium carbonate solution are also added and the mixture is then combined with a solution, prepared in the customary manner, of the diazonium salt of 12 g of aniline. After the coupling reaction has ended, the dyestuff is isolated in the customary manner by salting out, spray-drying or acidifying. The dried and ground dyestuff is a dark powder which dissolves in water giving a black-coloured solution. A black dyeing is obtained on cotton, paper or polyamide by known dyeing processes.

If 2,4-diaminotoluene, 3-aminophenylurea or 2,4-diamino-chloro-, -methoxy- or-ethoxy-benzene are used as the second coupling component instead of m-phenylenediamine, reddish-tinged to greenish-tinged black dyestuffs are obtained.

It is also possible to use 4-acetylaminoaniline, 4-methoxy- or ethoxy-aniline, 3-nitroaniline, 3- or 4-chloroaniline, 2-, 3- or 4-aminotoluene or 2,3- or 4-aminobenzoic acid as the diazo component, instead of aniline.

EXAMPLE 2

25.3 g (0.1 mol) of 3,3'-dichloro-4,4'-diaminodiphenyl are bis-diazotised and coupled on one side under acid conditions using a solution of 31.9 g (0.1 mol) of H-acid, as described in Example 1. A neutral solution of 18 g of 2,4-diaminobenzenesulphonic acid in 250 ml of water is then added, the pH is adjusted to 5 with dilute sodium carbonate solution and the mixture is stirred until the second coupling reaction has ended. The pH is adjusted to 9 to 10 and the mixture is combined with a solution of the diazonium salt of 10 g of aniline. The coupling reaction proceeds rapidly. The dyestuff is isolated in the customary manner and dried. The dyestuff is a dark powder which dissolves in water, giving a greenish-tinged black-coloured solution, and dyes cotton and leather in greenish-tinged black shades.

If a solution of the diazonium salt of 4-acetoaminoaniline or of 4-methoxy- or ethoxy-aniline is used instead of aniline, greenish-tinged black dyestuffs are likewise obtained.

If the 2,4-diaminobenzenesulphonic acid is replaced by the equivalent amount of 4-acetylamino-2-aminobenzenesulphonic acid, 4-oxalylamino-2-aminobenzenesulphonic acid, 1-sulphomethylamino-3-aminobenzene or 1-carboxymethylamino-3-aminobenzene, using the diazonium salt of aniline, 4-methoxyaniline, 4-acetylaminoaniline or 3-chloro- or 3-nitro-aniline, dyestuffs which dissolve in water, giving black to black-green solutions, and dye cotton and paper in black or black-green shades, are obtained.

We claim:

1. Dyestuffs which, in the form of the free acid, correspond to the formula

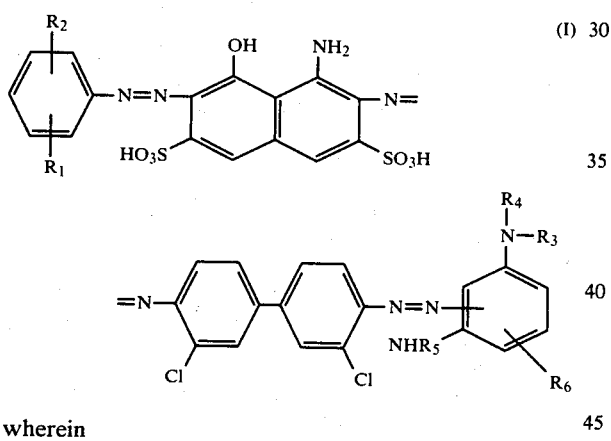

(I)

wherein
$R_1$ denotes hydrogen, methyl or chlorine,
$R_2$ denotes hydrogen, chlorine, acetylamino, methoxy, ethoxy, nitro or carboxyl,
$R_3$ denotes hydrogen, sulpho-$C_1$-$C_2$-alkyl, carboxy-$C_1$-$C_2$-alkyl or $C_1$-$C_4$-alkyl,
$R_4$ denotes hydrogen or $C_1$-$C_4$-alkyl,
$R_5$ denotes hydrogen or acyl and
$R_6$ denotes hydrogen, methyl, methoxy, ethoxy, chlorine, carboxyl, nitro or sulpho.

2. Dyestuffs according to claim 1, of the formula

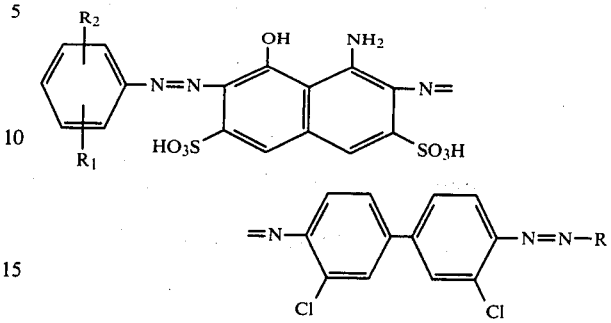

wherein
R denotes 1,3-diaminophenyl, 1-sulphomethylamino-3-aminophenyl or 1-(N,N-diethylamino)-3-acetylaminophenyl, or, above all, 1-sulpho-2,4-diaminophenyl and
$R_1$ and $R_2$ have the meaning given in claim 1.

3. Process for the preparation of dyestuffs according to claim 1, characterised in that diazotised amines of the formula

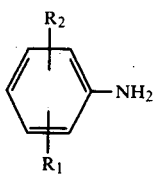

wherein $R_1$ and $R_2$ have the meaning given in claim 1, are coupled to disazo dyestuffs of the formula

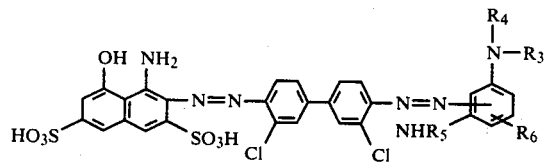

wherein $R_3$, $R_4$, $R_5$ and $R_6$ have the meaning given in claim 1, in an alkaline medium.

4. Use of the dyestuffs according to claim 1 for dyeing substrates which can be dyed with direct dyestuffs.

5. Use of the dyestuffs according to claim 1 for dyeing cotton.

* * * * *